(12) United States Patent
Rochman et al.

(10) Patent No.: US 11,537,511 B2
(45) Date of Patent: Dec. 27, 2022

(54) DYNAMIC CONFIGURING OF RELIABILITY AND DENSITY OF NON-VOLATILE MEMORIES

(71) Applicant: Infineon Technologies LLC, San Jose, CA (US)

(72) Inventors: Amir Rochman, Tel-aviv (IL); Ori Tirosh, Matan (IL); Yi He, Fremont, CA (US); Amichai Givant, Rosh Ha'Ayin (IL)

(73) Assignee: INFINEON TECHNOLOGIES LLC, San Jose, CA (US)

( * ) Notice: Subject to any disclaimer, the term of this patent is extended or adjusted under 35 U.S.C. 154(b) by 0 days.

(21) Appl. No.: 17/125,833

(22) Filed: Dec. 17, 2020

(65) Prior Publication Data
US 2022/0043745 A1 Feb. 10, 2022

Related U.S. Application Data

(60) Provisional application No. 63/061,242, filed on Aug. 5, 2020.

(51) Int. Cl.
*G06F 12/02* (2006.01)

(52) U.S. Cl.
CPC .. *G06F 12/0246* (2013.01); *G06F 2212/1032* (2013.01); *G06F 2212/202* (2013.01)

(58) Field of Classification Search
CPC ......... G06F 12/0246; G06F 2212/1032; G06F 2212/202
See application file for complete search history.

(56) References Cited

U.S. PATENT DOCUMENTS

| 2005/0273548 | A1* | 12/2005 | Roohparvar | G11C 16/0483 |
| | | | | 711/103 |
| 2006/0007944 | A1 | 1/2006 | Movassaghi et al. | |
| 2008/0215800 | A1* | 9/2008 | Lee | G07C 9/257 |
| | | | | 711/103 |
| 2009/0113115 | A1 | 4/2009 | Nazarian et al. | |
| 2010/0205352 | A1* | 8/2010 | Chu | G11C 29/82 |
| | | | | 711/103 |
| 2012/0072653 | A1 | 3/2012 | Roohpavar | |
| 2012/0297122 | A1* | 11/2012 | Gorobets | G06F 3/068 |
| | | | | 711/103 |

(Continued)

OTHER PUBLICATIONS

International Search Report and Written Opinion of the International Searching Authority for International Application No. PCT US21/44585, dated Nov. 5, 2021; 13 pages.

(Continued)

*Primary Examiner* — Tasnima Matin

(57) ABSTRACT

Systems, methods, and devices dynamically configure non-volatile memories. Devices include non-volatile memories comprising a plurality of memory regions, each of the plurality of memory regions having a configurable bit density. Devices also include control circuitry configured to retrieve user partition configuration data identifying a plurality of bit densities for the plurality of memory regions, convert a received user address to a plurality of physical addresses based, at least in part, on the plurality of bit densities, compare the user address with the user partition configuration data, and select one of the plurality of physical addresses based, at least in part, on the comparison.

19 Claims, 7 Drawing Sheets

(56) References Cited

U.S. PATENT DOCUMENTS

| | | | |
|---|---|---|---|
| 2013/0067138 A1* | 3/2013 | Schuette | G06F 3/0679 |
| | | | 711/103 |
| 2014/0063937 A1 | 3/2014 | Goldman et al. | |
| 2014/0108891 A1 | 4/2014 | Strasser et al. | |
| 2014/0359382 A1* | 12/2014 | Choi | G06F 11/2094 |
| | | | 714/710 |
| 2019/0095116 A1* | 3/2019 | Igahara | G06F 3/0619 |

OTHER PUBLICATIONS

"CoreVA-MPSoC: A Many-Core Architecture with Tightly Coupled Shared and Local Data Memories"; IEEE Transactions on Parallel and Distributed Systems 29(5) pp. 1030-1043, May 2018.I.

* cited by examiner

DYNAMIC CONFIGURING OF RELIABILITY AND DENSITY OF NON-VOLATILE MEMORIES

CROSS-REFERENCE TO RELATED APPLICATIONS

This application claims the benefit under 35 U.S.C. § 119(e) of US Provisional Patent Application No. 63/061,242, filed on Aug. 5, 2020, which is incorporated herein by reference in its entirety for all purposes

TECHNICAL FIELD

This disclosure generally relates to non-volatile memories, and more specifically, to dynamic configuration and referencing associated with such non-volatile memories.

BACKGROUND

Memory devices may include various memory cells that are configured to store data values based on programming received via various word lines and bit lines. Memory cells, and storage locations mapped to such memory cells, may be referenced using memory addresses, which may be numerical strings used to identify such storage locations. Various aspects of the storage of data values may be specified. For example, a number of bits stored in a memory cell may be specified. Traditional memory devices remain limited in their ability to specify a number of bits stored in a memory cell because they are not able to implement such changes dynamically and in the context of memory region-specific configuration.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

As discussed above, memory devices may include arrays of memory cells, and such memory cells may be used to store data values, and may be referenced using various addressing schemes. As will be discussed in greater detail below, a memory address space associated with such memory cells may include physical addresses corresponding to the physical storage locations, and may also include logical addresses mapped to those physical addresses. In various embodiments, a logical address space may be a user address space in which a user defines user addresses for start points and end points of each of multiple regions of the entire memory space. The user may also store various storage parameters for each of the regions. In this way, the user may identify and specify various parameters, such as a bit density, of units included in each defined region. As will be discussed in greater detail below, a bit density may refer to a number of bits stored in a unit of memory, such as a memory cell. This user configuration information may be stored as user partition configuration data. Moreover, this user address space may be mapped to a physical space and physical addresses.

Various embodiments disclosed herein provide the ability to dynamically configure such parameters of such memory regions. As will be discussed in greater detail below, a user may make modifications to bit densities specified for particular memory regions, and control circuitry included in the memory device may generate and select an appropriate physical address based on the specified bit density. In this way, memory devices disclosed herein may be configured to implement physical addressing in a manner that supports user-configuration of bit densities of different memory regions of memory arrays.

Figure 1:
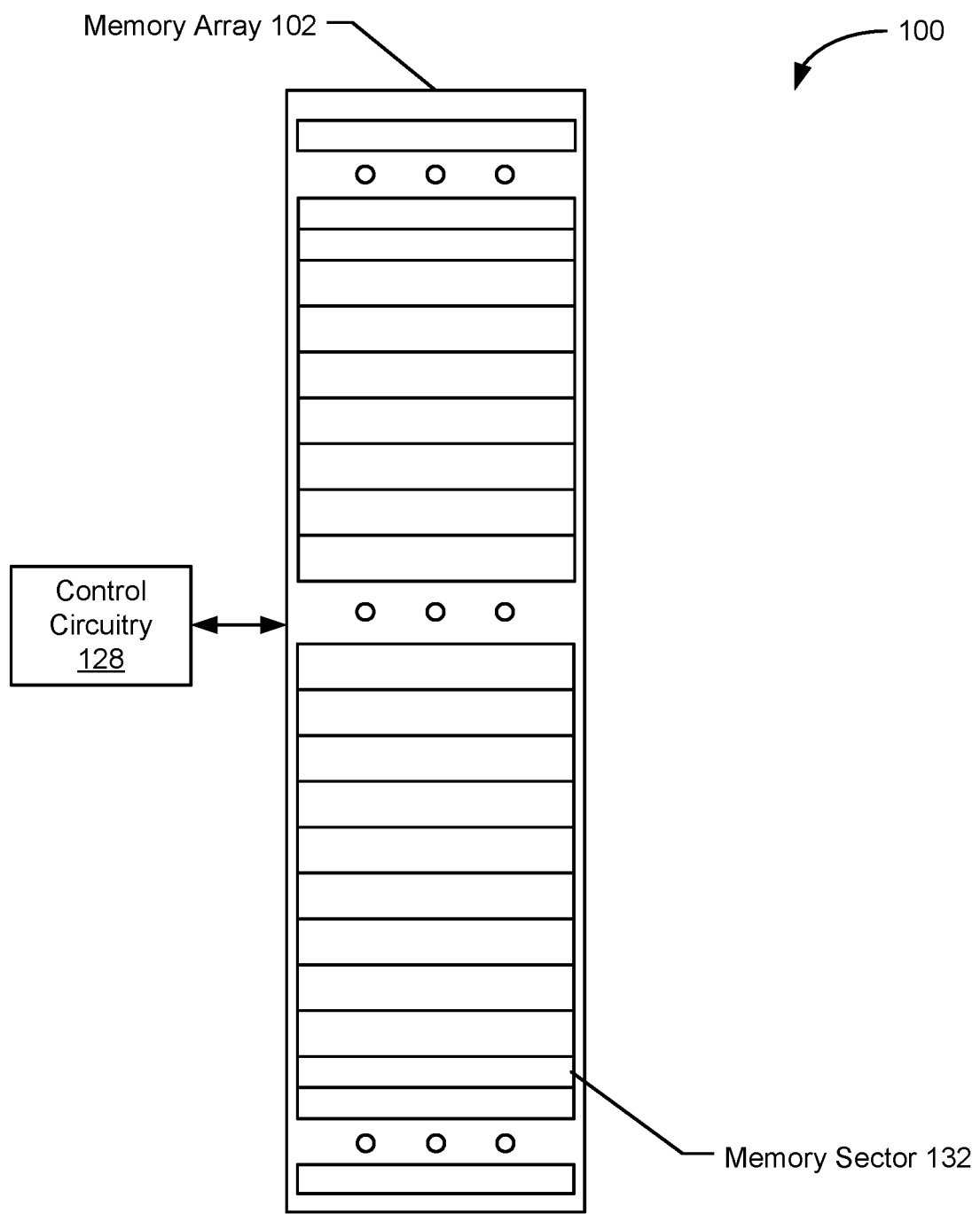
FIG. 1 illustrates an example of a system for dynamic configuration of non-volatile memories, configured in accordance with some embodiments.

FIG. 1 illustrates an example of a system for dynamic configuration of non-volatile memories, configured in accordance with some embodiments. FIG. 1 illustrates an example of a memory device, configured in accordance with some embodiments. As discussed above, memory devices, such as memory device 100, may include various storage locations that may be identified based on user-defined addresses as well as physical addresses. Moreover, various parameters associated with such storage locations may be specified. For example, various storage parameters and wear leveling parameters may be specified for different regions of memory device 100. As will be discussed in greater detail below, memory device 100 may be configured to enable dynamic configuration of various storage parameters, such as a bit density of memory device 100.

In various embodiments, memory device 100 may be a storage device that includes several non-volatile memory elements in a memory array, such as memory array 102. Accordingly, memory array 102 may include numerous columns and rows of memory elements that may be grouped or divided into sectors. In various embodiments, such sectors may be a group of data units, such as words, that may be erased as a unit. In various embodiments, the sectors shown in FIG. 1 are logical sectors that may be mapped to physical sectors. In some embodiments, logical sectors may be sectors of data that are referenced by a memory array address that is independent of the physical location of the data within the memory array. Accordingly, a host system may view a logical sector as residing at particular address (e.g. starting at address zero of the memory array). In this example, the data may actually be located in a different part of the memory array address space, at a different physical address. In various embodiments, memory device 100 maintains a mapping table from the logical address of the data to corresponding actual physical locations. In this way, memory device 100 may include various physical memory sectors that may be mapped to logical memory sectors, such as memory sectors 132. As will be discussed in greater detail below, memory sectors may be grouped into partitions. In various embodiments, a user may define various partitions of memory sectors.

As discussed above, storage parameters may be specified for different memory partitions, also referred to herein as memory regions. For example, a particular bit density may be specified for memory cells included in memory regions. Such a bit density may be specified by a user during configuration of memory device 100. Alternatively, the bit density may be downloaded from another storage location as part of configuration parameters. For example, such configuration parameters may be included in firmware. As will be discussed in greater detail below, the specified bit density may affect physical addresses associated with stored bits. For example, if a memory sector is configured as having a density of two bits per cell, that memory sector may have a size of 64 KB. However, if configured as having a density of one bit per cell, that same memory sector may have a size of 128 KB. In such a situation, the addresses in the user space, as may be represented in by logical addresses, may remain the same. However, the addresses in the physical space, as may be represented by physical addresses, may change due to the change in bit density. In this way, configuration of bit densities for particular partitions and underlying sectors of memory may cause changes to physical address schemes. As will be discussed in greater detail below, components of memory device 100 are configured to dynamically compute appropriate physical addresses to compensate for such changes.

Memory device 100 further includes control circuitry 128 which is coupled to memory array 102. In various embodiments, control circuitry 128 is configured to dynamically generate physical addresses for received user addresses to enable the dynamic configuration of bit densities of memory regions discussed above. As will be discussed in greater detail below with reference to FIGS. 2-4, control circuitry 128 may include one or more processors and/or one or more registers configured to convert a received user address to multiple physical addresses, and then to select a particular physical address based on a specified bit density. Accordingly, control circuitry 128 may be configured to manage the translation of user addresses to physical addresses, as will be discussed in greater detail below. In various embodiments, control circuitry 128 is also configured to implement other operations associated with memory array 102, such as the generation of control signals associated with read and write operations, as well as underlying program and erase operations, and the programming of dynamic reference bits. Additional details regarding such operations are discussed in greater detail below.

Figure 2:
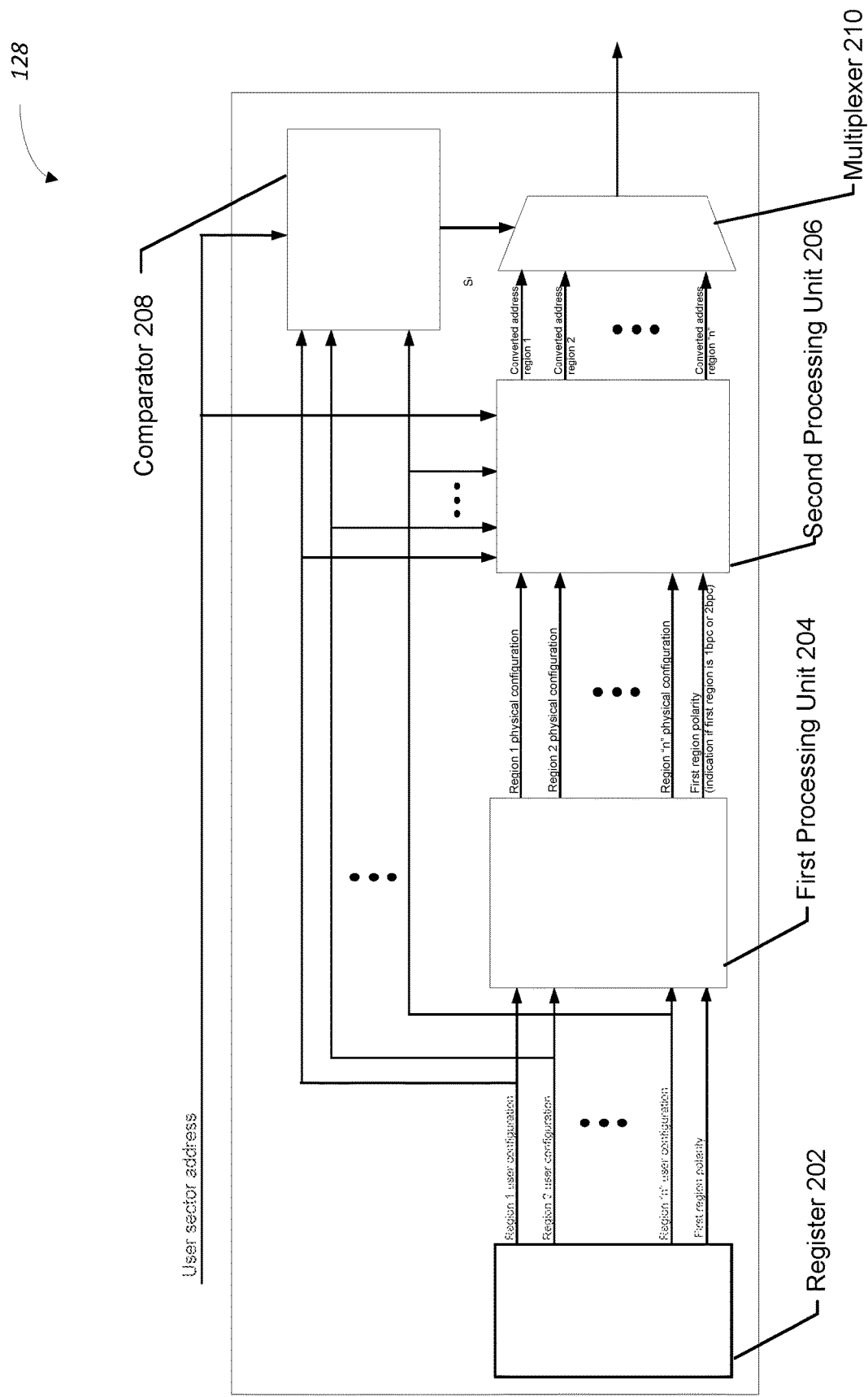
FIG. 2 illustrates an example of a device for dynamic configuration of non-volatile memories, configured in accordance with some embodiments.

FIG. 2 illustrates an example of a device for dynamic configuration of non-volatile memories, configured in accordance with some embodiments. As similarly discussed above, memory devices disclosed herein may facilitate dynamic configuration of various aspects of regions of memory. As will be discussed in greater detail below, specific components of devices, such as control circuitry 128, may be configured to implement the conversion of user addresses into physical addresses in a manner that is consistent with a specified bit density. Accordingly, control circuitry 128 may be configured to provide dynamic user configuration of bit densities of individual regions of memory in a memory device.

In various embodiments, control circuitry 128 includes register 202 which is configured to store user partition configuration data. As discussed above, a user may define several partitions of a memory space, and each partition may include one or more memory regions, such as sectors. Accordingly, the user partition configuration data may include several addresses identifying start points for each user-defined partition, and the addresses may be represented in a user address space, which may be a logical address space. As previously discussed, the user partition configuration data may also include various parameters, such as parameters specifying a bit density for each of the partitions. In some embodiments, register 202 is configured to communicate, via an interface, with other system components to download and/or receive user partition configuration data from a source which may be another storage location, or may be from an input provided by the user.

Control circuitry 128 further includes first processing unit 204 which is configured to convert the user partition configuration data to physical configuration data. As discussed above, the user partition configuration data may be stored using a user address space which may be a logical address space, and may include partition configuration data for each partition and region of the memory. In various embodiments, first processing unit 204 is configured to convert the user address space to a physical address space. Accordingly, first processing unit 204 is configured to convert the stored user partition configuration data to a physical address space represented by physical addresses determined based on the region sizes and corresponding bit densities specified in the user partition configuration data. As shown in FIG. 2, first processing unit 204 may also receive a polarity bit that may be stored in register 202. In some embodiments, the polarity bit may be a bit configured to provide a default or designated value for a first region of the memory. In one example, the polarity bit may be received for a first region, and bit densities may be inferred for other regions based on the received polarity bit. For example, the bit densities may alternate. In this way, and as will be discussed in greater detail below, bit densities for memory cells included in the partitions may be determined based on a received polarity bit, and the polarity bit, in combination with the other user partition configuration data, may be used to generate the appropriate physical addresses. In another example, the designated value may be configured to set a bit density for an initial region of memory if no user-specified value is available.

As discussed above, user partition configuration data may be converted to a physical address space. One example, of a conversion function that may be implemented by first processing unit 204 is given by equation 1 shown below:

$$\text{region\_config\_phy}[i] = \text{region\_config\_phy}[i-1] + ((\text{region\_config\_user}[i] - \text{region\_config+user}[i-1]) \gg \text{region\_type}[i]) \quad (1)$$

In equation 1, i may represent an index of memory regions. In this way, user partition configuration data may be converted to physical configuration data.

Control circuitry 128 additionally includes second processing unit 206 which is configured to convert a particular user sector address to multiple physical addresses. Accordingly, second processing unit 206 may be configured to receive a user sector address that may be associated with a particular memory access request, and may generate multiple physical addresses for the different defined memory regions in accordance with their specified bit densities. For example, a the user sector address may be received, and a first physical addresses may be generated for a first region based on a first bit density, and second physical addresses may be generated for a second region based on a second bit density. In this way, multiple physical addresses may be generated for a user address to support a dynamic switch between bit densities.

As discussed above, a received user sector address may be converted to a physical address for each region and its underlying bit density. One example, of a conversion function that may be implemented by second processing unit 206 is given by equation 2 shown below:

$$phy\_addr[i]=region\_config\_phy[i]+((user\_addr-region\_config\_user[i])>>region\_type[i]) \quad (2)$$

In equation 2, i may represent an index of memory regions. In this way, multiple physical addresses may be generated for a received user address.

Control circuitry 128 also includes comparator 208 which is configured to compare the received user sector address with the user partition configuration data. As discussed above, a user address may be received that may be associated with a memory access request. Accordingly, comparator 208 may compare the received user sector address with the user partition configuration data to identify a memory region associated with the received user sector address. In this way, the received user sector address may be used to look up a specific memory region that includes the user sector address.

Control circuitry 128 further includes multiplexer 210 which is configured to select a physical address based on an output of comparator 208. Accordingly, the memory region and underlying bit density identified by comparator 208 may be used to generate a select signal that is sent to multiplexer 210. In response to receiving the select signal, multiplexer 210 may select one of the physical addresses generated by second processing unit 206, and provide that selected physical address as an output of control circuitry 128. As discussed above, the physical address that is output may be selected based on the identified memory region, which may be a specific user partition.

In various embodiments, a number of partitions included in the user memory space and corresponding physical memory space may also be configured. For example, a memory may support up to "n" regions that may be configured. In this example, a user may determine that "m" regions should be configured, where m<n. Accordingly, all region configurations between "m" and "n" may be set to addresses higher than a maximum user address. In this way, such regions may be excluded from the comparing discussed above, and are not selected.

Figure 3:
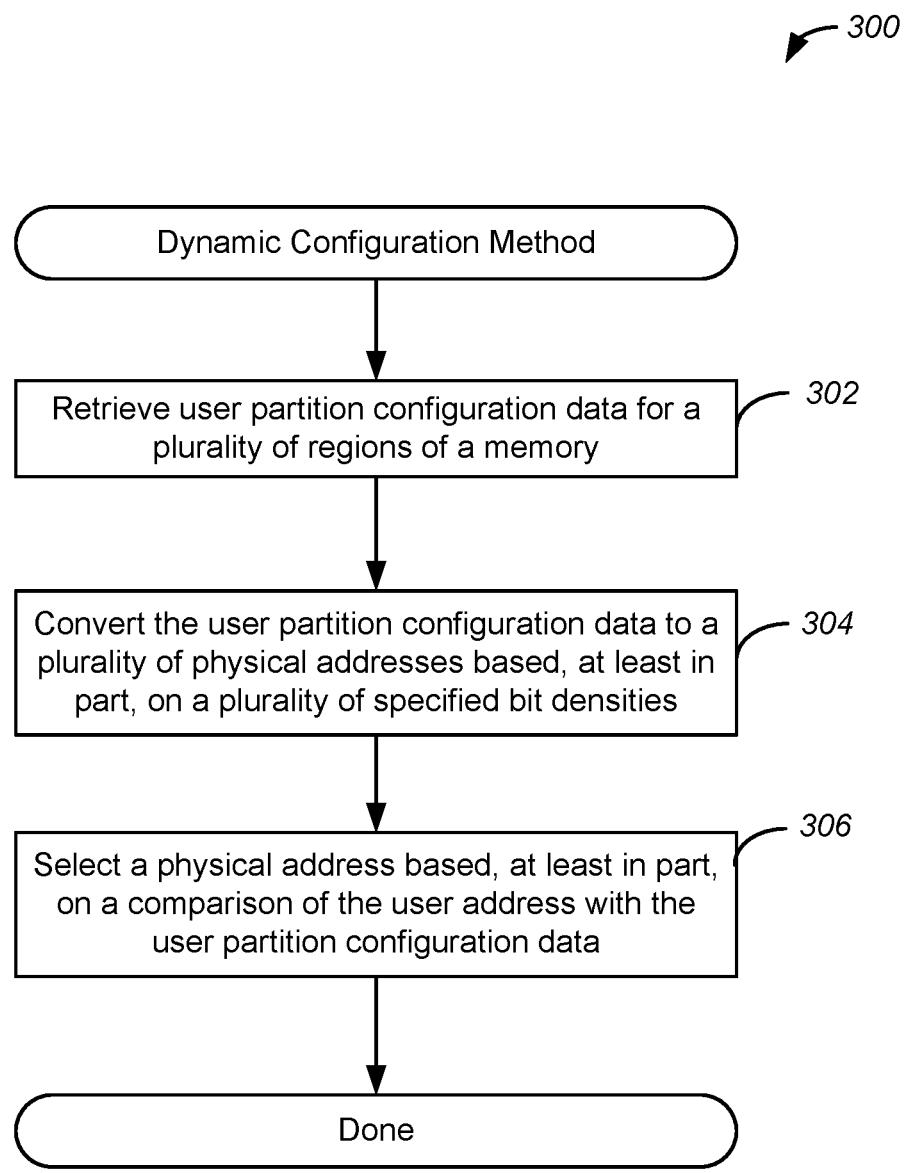
FIG. 3 illustrates an example of a method for dynamic configuration of non-volatile memories, implemented in accordance with some embodiments.

FIG. 3 illustrates an example of a method for dynamic configuration of non-volatile memories, implemented in accordance with some embodiments. As similarly discussed above, memory devices disclosed herein may facilitate dynamic configuration of various aspects of regions of memory. As will be discussed in greater detail below, a method, such as method 300, may be implemented to dynamically convert a user address into a physical address in a manner that is consistent with a specified bit density. As discussed above, the bit density may be specified by a user. Accordingly, a method, such as method 300, may be implemented to provide dynamic user configuration of bit densities of individual regions of memory in a memory device.

Method 300 may commence with operation 302 during which user partition configuration data may be retrieved for a plurality of regions of a memory. As discussed above, a user may define several partitions of a memory space, and each partition may include one or more memory sectors. Moreover, each region may have one or more user-defined parameters, such as a bit density. Accordingly, during operation 302, the user partition configuration data may be downloaded and/or received from a source which may be another storage location, or may be from an input provided by the user.

Method 300 may proceed to operation 304 during which the user partition configuration data may be converted to a plurality of physical addresses based, at least in part, on a plurality of specified densities. As similarly discussed above, a user partition configuration data may be represented in a logical address space. During operation 304, the logical addresses may be converted to physical addresses in accordance with the specified bit densities.

Method 300 may proceed to operation 306 during which a physical address may be selected based, at least in part, on a comparison of a user address with the user partition configuration data. As discussed above, user partition configuration data may define regions having one or more bit densities. Accordingly, a particular region may be identified by the user address, and an appropriate physical address may be selected based on the bit density and the identified memory region associated with the user address. In this way, a bit density for the user region may be changed or modified dynamically, and physical addresses may be selected and implemented commensurately.

Figure 4:
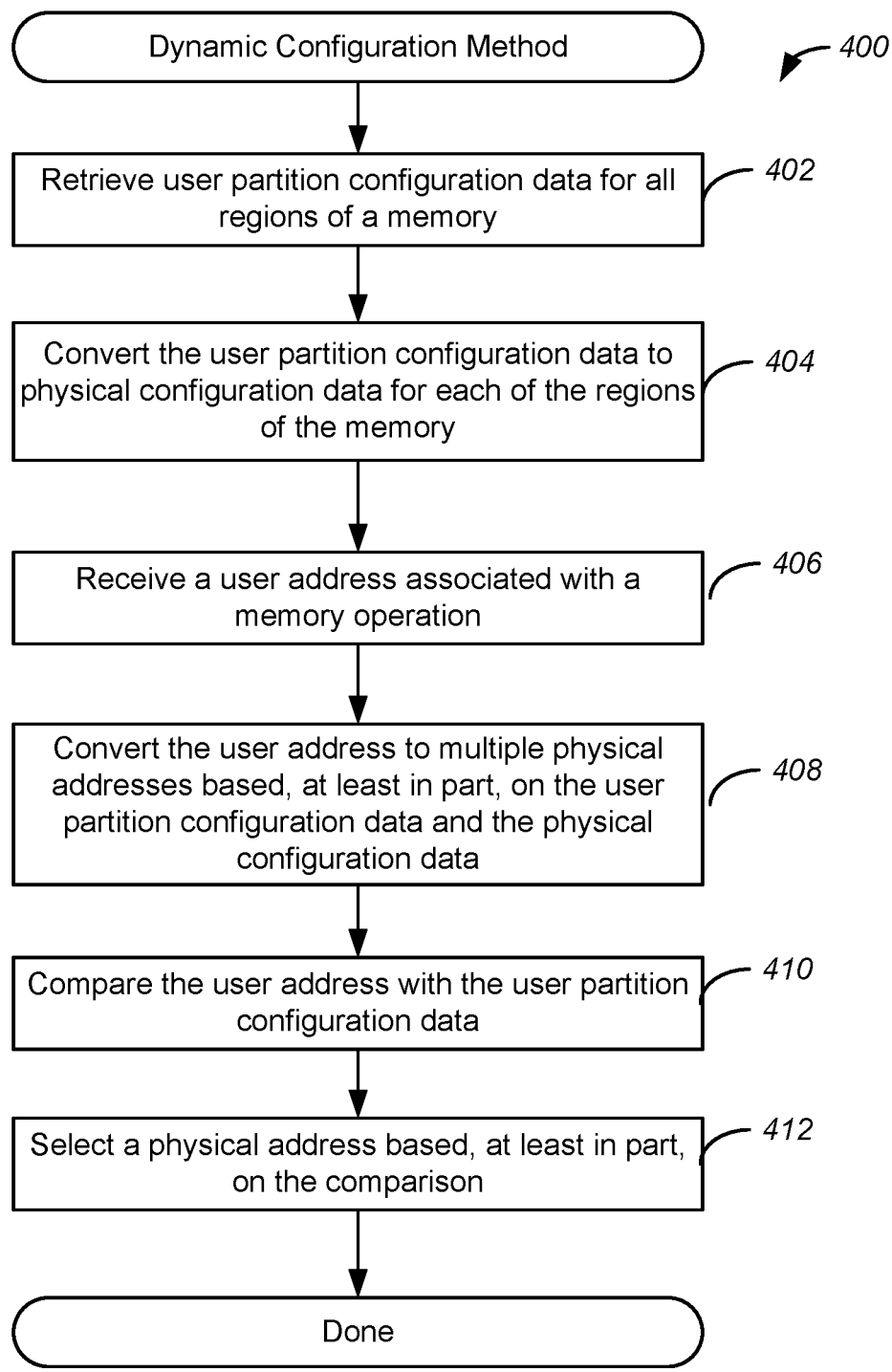
FIG. 4 illustrates another example of a method for dynamic configuration of non-volatile memories, implemented in accordance with some embodiments.

FIG. 4 illustrates another example of a method for dynamic configuration of non-volatile memories, implemented in accordance with some embodiments. As similarly discussed above, memory devices disclosed herein may dynamically convert a user address into a physical address in a manner that is consistent with a user-specified bit density. As will be discussed in greater detail below, a method, such as method 400, may be implemented to identify a user address and select an appropriate physical address based on user partition configuration data. Accordingly, method 400, may generate multiple different physical addresses, and select the appropriate physical address based on a user-specified bit density.

Method 400 may commence with operation 402 during which user partition configuration data may be retrieved for all regions of a memory. As discussed above, a user may define several partitions of a memory space, and each partition may include one or more memory sectors. Moreover, each region may have one or more user-defined parameters, such as a bit density. Accordingly, during operation 402, the user partition configuration data may be downloaded and/or received from a source which may be another storage location, or may be from an input provided by the user.

Method 400 may proceed to operation 404 during which the user partition configuration data may be converted to physical configuration data for each of the regions of the memory. In various embodiments, the physical configuration data may be configuration data that stores the user-defined partitions and regions in a physical address space as physical addresses and in accordance with the user-defined bit densities. Accordingly, during operation 404, physical addresses may be generated such that a physical address space is created based on the partitions and bit densities defined by the user partition configuration data. In one example, the memory device used to implement the physical address space may include memory cells that are capable of implementing multiple different bit densities, such as 1 bit per cell and 2 bits per cell. Accordingly, during operation 404, the physical addresses may be generated for different partitions based on a first bit density that is 1 bit per cell and a second bit density that is 2 bits per cell. Moreover, the physical configuration data may be stored in a memory, such as a register. In some embodiments, the physical address space may have been pre-calculated and may be downloaded from a storage location during operation 404. Moreover, in some embodiments, during operation 404, physical configuration data may be received or retrieved, and may be converted to user partition configuration data if appropriate. In various embodiments, a combination of user partition configuration data and physical data may be received. In such embodiments, the physical configuration data may have been pre-computed from the user partition configuration data.

Method 400 may proceed to operation 406 during which a user address may be received. As similarly discussed above, a user address may be received in the context of a memory access request or storage operation. Accordingly, the user address may be received from another system component which may be another component of the memory, or may be another component of a computing device that includes the memory. The user address may be represented in a logical address space. As will be discussed in greater detail below, the user address may be converted to a physical address based, at least in part, on a user-defined bit density.

Method 400 may proceed to operation 408 during which the user address may be converted to a multiple physical address based, at least in part, on the user partition configuration data and the physical configuration data. As similarly discussed above, the user address may be converted to a physical address for each region of the physical address space and in accordance with the bit density underlying each region. As discussed above, the memory device may include memory cells that are capable of implementing bit densities, such as 1 bit per cell and 2 bits per cell. Accordingly, during operation 408, the multiple physical addresses may be generated based on bit densities such as a first bit density that is 1 bit per cell and a second bit density that is 2 bits per cell.

Method 400 may proceed to operation 410 during which the user address may be compared with the user partition configuration data. Accordingly, the received user address may be compared with user partition configuration data and a particular memory region may be identified. More specifically, it may be determined in which memory region the received user address is included. Furthermore, a user-defined bit density may also be identified user partition configuration data for that particular memory region.

Method 400 may proceed to operation 412 during which a physical address may be selected based, at least in part, on the comparison. As discussed above, user partition configuration data may identify various partitions and their associated bit densities. Accordingly, the partition identified during operation 410 may be used to select an appropriate physical address. For example, if it is determined that the user address is included in a second region of the user address space, the computed physical address for the second region may be selected. Accordingly, the appropriate physical address may be selected in a manner consistent with a user-defined bit density that may specify a bit density of 1 bit per cell or 2 bits per cell. The selected physical address may then be subsequently use for the memory access operation associated with the received user address.

Figure 5:
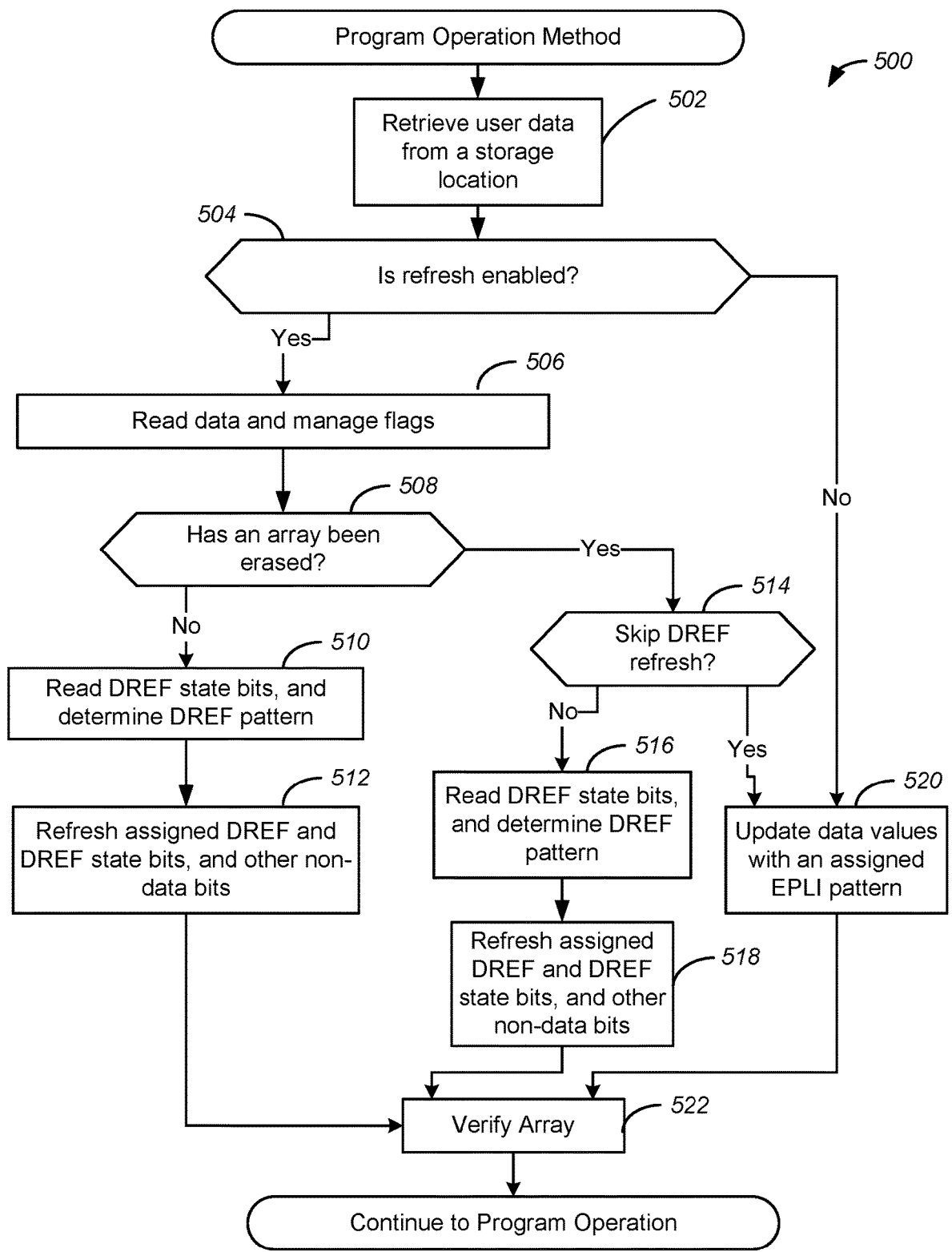
FIG. 5 illustrates an example of a method for dynamic referencing of non-volatile memories, implemented in accordance with some embodiments.

FIG. 5 illustrates an example of a method for dynamic referencing of non-volatile memories, implemented in accordance with some embodiments. In various embodiments, memories disclosed herein may utilize dynamic reference state (DREF-state) bits that are configured to utilize a unique pattern to identify a specific data type stored in a memory partition. Accordingly, DREF state bits may be used to identify if a particular memory region is stored at 1 bit per cell or 2 bits per cell. More specifically, particular bits in a sector array are configured to identify a DREF configuration state. As will be discussed in greater detail below, embodiments disclosed herein may implement various methodologies to program and/or refresh DREF state bits such that they are dynamically configured to remain consistent with the dynamically configured memory regions described above.

Method 500 may commence with operation 502 during which user data may be retrieved from a storage location. In various embodiments, user data may be loaded into a memory buffer from a storage location in memory. As will be discussed in greater detail below, the data may include stored data values as well as associated data, such as bits representing flags.

Method 500 may proceed to operation 504 during which it may be determined if a refresh operation should be implemented. In various embodiments, the determination of whether or not a refresh operation should be implemented may be made based on one of the retrieved flags. If a refresh operation is identified as not enabled, method 500 may proceed to operation 520 discussed in greater detail below. If a refresh operation is identified as enabled, method 500 may proceed to operation 508.

Accordingly, during operation 506, data may be read and one or more flags may be managed. Accordingly, previously stored data may be read into the memory buffer, and an error correction code may be generated. Moreover, an error correction code may be set, as well as a program event flag.

Method 500 may proceed to operation 508 during which it may be determined if the array is erased based on one of the retrieved flags. If it is determined that the array is erased, method 500 may proceed to operation 514. If it is determined that the array is not erased, method 500 may proceed to operation 510.

Accordingly, method 500 may proceed to operation 510 during which DREF state bits may be read, and a DREF pattern may be determined. As discussed above, the DREF state bits and the DREF pattern may identify one or more storage parameters of the memory region in which the program operation is being implemented, such as a bit density. In one example, DREF state bits may be configured as flag bits used to identify a DREF pattern which may be a bit density pattern, such as 1 bit per cell or 2 bits per cell. Accordingly, during operation 510, such DREF state bits may be read from the storage location, and the DREF pattern may be identified.

Method 500 may proceed to operation 512 during which the DREF pattern and DREF state bits may be refreshed, and other bits may be refreshed as well. Accordingly, the buffer may be a volatile memory, and values stored in the buffer may be refreshed. In this way, the DREF state bits and DREF pattern may be refreshed to maintain consistency with the storage parameters of the memory region. In various embodiments, other non-data bits may be refreshed as well. For example, erase power loss indicator (EPLI) bits may also be refreshed. Method 500 may then proceed to operation 522 discussed in greater detail below.

Returning to operation 508, if it is determined that the array has been erased, method 500 may proceed to operation 514 during which it may be determined if a refresh operation should be skipped for the DREF bits and DREF state bits. In various embodiments, such a determination may be made based on the retrieved flags. If it is determined that a refresh operation for the DREF bits and DREF state bits should be skipped, method 500 may proceed to operation 520 during which stored non-data values may be updated. Such non-data values may be other bits that are not DREF bits or DREF state bits. For example, an assigned EPLI pattern may be updated. If it is determined that a refresh operation should be implemented for the DREF state bits, method 500 may proceed to operation 516.

Accordingly, during operation 516 DREF state bits may be read and a DREF pattern may be determined. As discussed above, the DREF state bits and the DREF pattern may be flag bits used to identify a DREF pattern which may be a bit density pattern, such as 1 bit per cell or 2 bits per cell. Accordingly, during operation 516, such DREF state bits may be read from the storage location, and the DREF pattern may be identified.

Method 500 may proceed to operation 518 during which the values stored in the buffer may be refreshed. Accordingly, DREF bits and DREF state bits may be refreshed. As also discussed above, other non-data bits may be updated as well. In this way, the DREF state bits and DREF pattern may be refreshed to maintain consistency with the storage parameters of the memory region.

Method 500 may proceed to operation 522 during which one or more verification operations may be implemented. In various embodiments, the verification operations may include any suitable implementation of value checking or computation of an error checking code.

Figure 6:
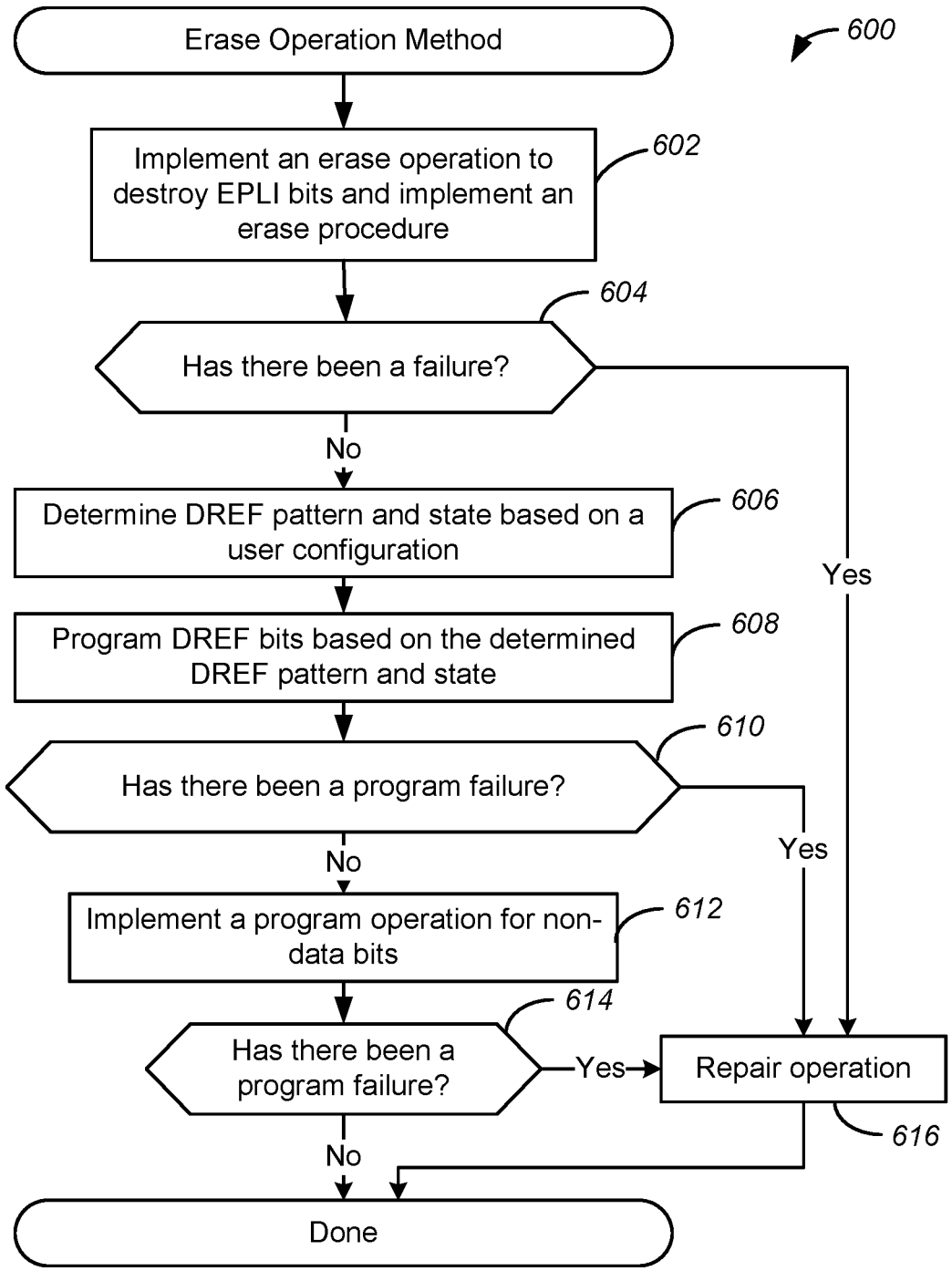
FIG. 6 illustrates another example of a method for dynamic referencing of non-volatile memories, implemented in accordance with some embodiments.

FIG. 6 illustrates another example of a method for dynamic referencing of non-volatile memories, implemented in accordance with some embodiments. In various embodiments, memories disclosed herein may utilize dynamic reference (DREF) bits that are configured to utilize a unique pattern to identify a specific data type stored in a memory partition. As discussed above, DREF bits may be used to identify if a particular memory region is stored at 1 bit per cell or 2 bits per cell. As will be discussed in greater detail below, embodiments disclosed herein may implement various methodologies to erase operations such that DREF state bits are dynamically updated to remain consistent with dynamically configured memory regions described above.

Method 600 may commence with operation 602 during which an erase operation may be implemented. In various embodiment, the erase operation may commence with the destruction of the EPLI code, as well as the implementation of an erase procedure or flow. In various embodiments, such an erase procedure may be implemented following the destruction of the EPLI code. The erase procedure may include the erasure of bits stored in memory as well as all other operations typically included in an erase operation of a memory array. In various embodiments, the destruction of the EPLI code may include programming all "0" bits in the EPLI code.

Method 600 may proceed to operation 604 during which it may be determined if there has been a failure during the erasure operation. Such a determination may be made based on one or more flags set at the termination of the soft program operation. If it is determined that there has been a failure, method 600 may proceed to operation 616 during which one or more repair operations may be implemented. If it is determined that there has not been a failure, method 600 may proceed to operation 606.

Method 600 may proceed to operation 606 during which a DREF pattern may be identified and DREF state bits may be determined based on a user configuration. Accordingly, a user may have defined a particular bit density for the memory region including the storage location in which the erase operation is being implemented. For example, the bit density may identify a bit density pattern, such as 1 bit per cell or 2 bits per cell. Accordingly, the user-specified bit density may be used to identify a DREF pattern, and generate the corresponding DREF state bits.

Method 600 may proceed to operation 608 during which the values of the DREF state bits may be programmed. Accordingly, the determined DREF pattern and DREF state bits may be used to program new DREF state bits for the storage location on which the erase operation is being implemented. In this way, the DREF state bits and DREF pattern may be updated to maintain consistency with the storage parameters of the memory region.

Method 600 may proceed to operation 610 during which it may be determined if there has been a program failure. Such a determination may be made based on one or more flags set at the termination of the program operation. If it is determined that there has been a failure, method 600 may proceed to operation 616 during which one or more repair operations may be implemented. If it is determined that there has not been a failure, method 600 may proceed to operation 612.

Method 600 may proceed to operation 612 during which a program operation may be implemented for non-data bits. For example, an EPLI program operation may be implemented. Thus, according to various embodiments, additional data may be programmed as well, such as EPLI bits used for data integrity and resilience to power loss events.

Method 600 may proceed to operation 614 during which it may be determined if there has been a program failure. Such a determination may be made based on one or more flags set at the termination of the program operation. If it is determined that there has been a failure, method 600 may proceed to operation 616 during which one or more repair operations may be implemented. If it is determined that there has not been a failure, method 600 may terminate.

Figure 7:
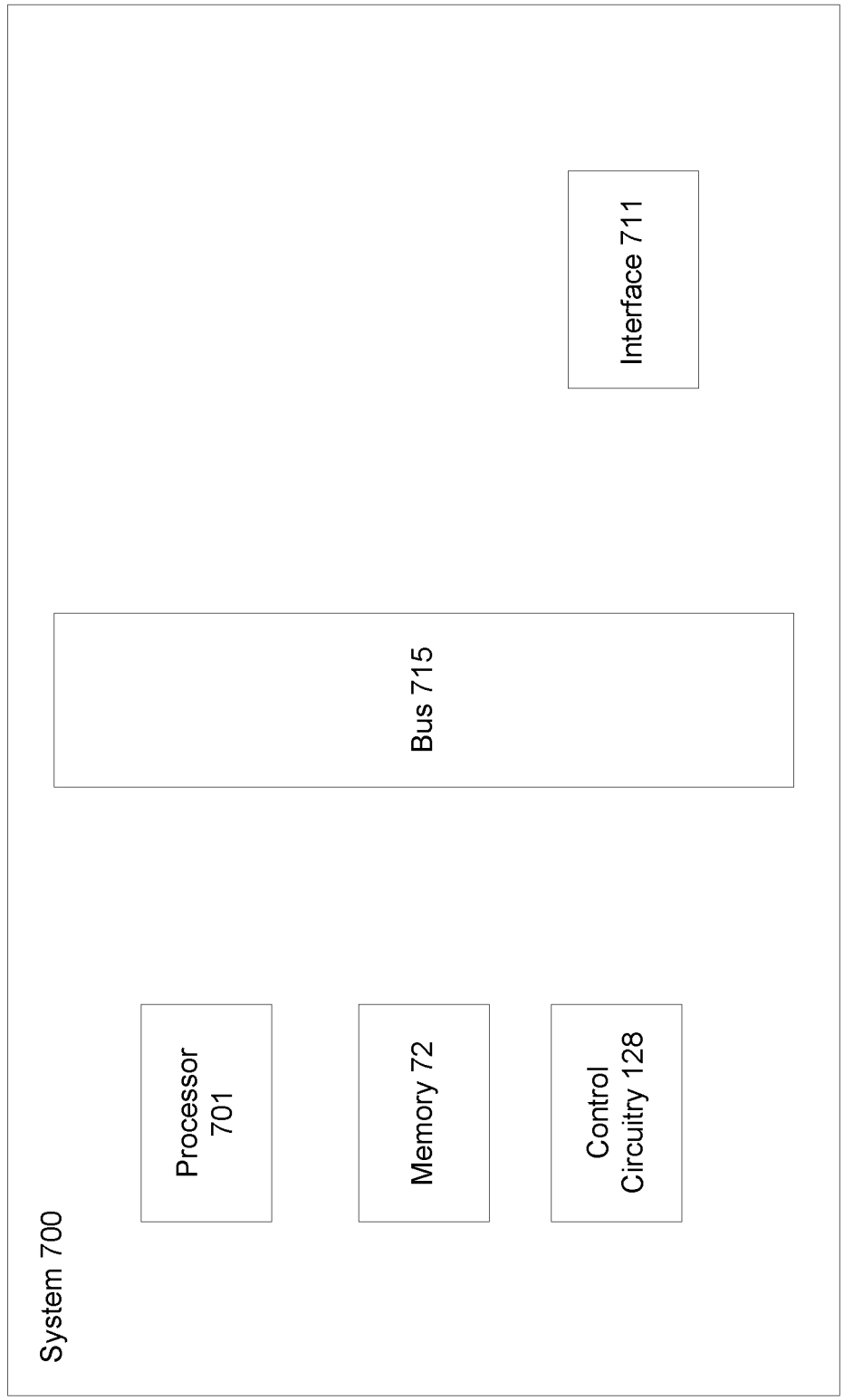
FIG. 7 illustrates an example of a memory system that may include a memory device, configured in accordance with some embodiments.

FIG. 7 illustrates an example of a memory system that may include a memory device, configured in accordance with some embodiments. According to particular example embodiments, system 700 may be suitable for implementing various components described above, such as memory device 100 as well as the control circuitry described above. In various embodiments, system 700 may include processor 701 which may be configured to implement one or more storage operations. For example, processor 701 may be configured to implement read and write operations associated with memory array 72. System 700 may also include bus 715 which may be configured to enable communication between various components of system 700.

In various embodiments, system 700 may further include memory array 72 and control circuitry 128 which may be configured to implement the addressing operations discussed above. In various embodiments, control circuitry 128 may include one or more processors and dedicated memory and/or registers that are configured to implement the previously described addressing operations. In this way, system 700 may have a dedicated processing unit, such as control circuitry 128, which may be configured to implement the previously described addressing. Moreover, in some embodiments, control circuitry 128 may be implemented in an application specific integrated circuit (ASIC), or may be implemented in reprogrammable logic of a field programmable gate array. In some embodiments, control circuitry 128 may be implemented in a programmable system or controller that further includes a non-volatile memory, such as a Programmable System On a Chip or PSoC™ controller, commercially available from Cypress Semiconductor of San Jose, Calif. In various embodiments, one or more components of system 700 may be implemented on the same circuit die and in the same package. For example, control circuitry 128 and memory 72 may be implemented on the same circuit die. In some embodiments, they may be implemented on different dies and in different packages.

In various embodiments, communications interface 711 may be configured to send and receive data to other system components, or may be configured to send and receive packets or data segments over a network. For example, communications interface 711 may be communicatively coupled to a user interface device via a bus, such as bus 715, or via a communications network. As discussed above, communications interface 711 may be configured to receive data from such a user interface device which may be included in a data processing system or computer system. In various embodiments, such data may include an input identifying storage parameters and/or user partition configuration data from a user. In various embodiments, communications interface 711 may be a device that supports Ethernet interfaces, frame relay interfaces, cable interfaces, and DSL interfaces. In addition, various very high-speed interfaces may be provided such as fast Ethernet interfaces, Gigabit Ethernet interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A device comprising:
   a non-volatile memory comprising a plurality of memory regions, each of the plurality of memory regions having a configurable bit density; and
   control circuitry configured to:
      retrieve user partition configuration data identifying a plurality of bit densities for the plurality of memory regions;
      convert a received user address to a plurality of physical addresses based, at least in part, on the plurality of bit densities;
      compare the user address with the user partition configuration data;
      select one of the plurality of physical addresses based, at least in part, on the comparison; and
      determine, during an erase operation, a dynamic reference pattern based on the user partition configuration data.

2. The device of claim 1, wherein the user partition configuration data comprises a user-specified bit density for each of the plurality of memory regions.

3. The device of claim 1, wherein the plurality of bit densities comprises one bit per cell and two bits per cell.

4. The device of claim 1, wherein the plurality of physical addresses comprises a first physical address generated based on a first bit density and a second physical address generated based on a second bit density.

5. The device of claim 1, wherein the comparison of the user address with the user partition configuration data comprises looking up a user-specified bit density for a memory region including the user address.

6. The device of claim 1, wherein the control circuitry is further configured to: read dynamic reference state bits and determine a dynamic reference pattern during a program operation.

7. The device of claim 6, wherein the control circuitry is further configured to:
   update the dynamic reference state bits.

8. The device of claim 1, wherein the control circuitry is further configured to:
   program dynamic reference state bits based on the determined dynamic reference pattern.

9. A method comprising:
   retrieving, using control circuitry, user partition configuration data identifying a plurality of bit densities for a plurality of memory regions;
   converting, using the control circuitry, a received user address to a plurality of physical addresses based, at least in part, on the plurality of bit densities;
   comparing, using the control circuitry, the user address with the user partition configuration data;
   selecting, using the control circuitry, one of the plurality of physical addresses based, at least in part, on the comparison; and
   determining a dynamic reference pattern based on the user partition configuration data.

10. The method of claim 9, wherein the user partition configuration data comprises a user-specified bit density for each of the plurality of memory regions.

11. The method of claim 9, wherein the plurality of physical addresses comprises a first physical address generated based on a first bit density and a second physical address generated based on a second bit density.

12. The method of claim 9, wherein the comparing of the user address with the user partition configuration data comprises looking up a user-specified bit density for a memory region including the user address.

13. The method of claim 12 further comprising:
    reading dynamic reference state bits; and
    updating, during a program operation, the dynamic reference state bits.

14. The method of claim 9 further comprising:
    programing, during an erase operation, dynamic reference state bits based on the determined dynamic reference pattern.

15. A system comprising:
    a non-volatile memory device comprising:
       a memory array comprising a plurality of memory regions, each of the plurality of memory regions having a configurable bit density;
    control circuitry configured to:
       retrieve user partition configuration data identifying a plurality of bit densities for the plurality of memory regions;
       convert a received user address to a plurality of physical addresses based, at least in part, on the plurality of bit densities;
       compare the user address with the user partition configuration data;
       select one of the plurality of physical addresses based, at least in part, on the comparison;

read dynamic reference state bits and determine a dynamic reference pattern during a program operation;

update the dynamic reference state bits during the program operation; and determine, during an erase operation, a dynamic reference pattern based on the user partition configuration data; and at least one register configured to store the user partition configuration data.

16. The system of claim 15, wherein the user partition configuration data comprises a user-specified bit density for each of the plurality of memory regions.

17. The system of claim 15, wherein the plurality of physical addresses comprises a first physical address generated based on a first bit density and a second physical address generated based on a second bit density.

18. The system of claim 15, wherein the comparison of the user address with the user partition configuration data comprises looking up a user-specified bit density for a memory region including the user address.

19. The system of claim 15, wherein the control circuitry is further configured to:

program, during the erase operation, dynamic reference state bits based on the determined dynamic reference pattern.

* * * * *